United States Patent
Rosenblatt et al.

(10) Patent No.: US 8,560,444 B2
(45) Date of Patent: Oct. 15, 2013

(54) SYSTEMS AND METHODS FOR PRESENTING PAYOFF INFORMATION TO CREDIT CARD CUSTOMERS

(75) Inventors: Brenda Rosenblatt, Omaha, NE (US); Yung-Li Lin, Omaha, NE (US); Millie Trent, Omaha, NE (US); Allen Kurth, Bellevue, NE (US); Robert Jeff Mills, Omaha, NE (US); Bruce Lindell, Bellevue, NE (US)

(73) Assignee: First Data Corporation, Englewood, CO (US)

( * ) Notice: Subject to any disclaimer, the term of this patent is extended or adjusted under 35 U.S.C. 154(b) by 2627 days.

(21) Appl. No.: 10/165,788

(22) Filed: Jun. 7, 2002

(65) Prior Publication Data

US 2003/0229589 A1    Dec. 11, 2003

(51) Int. Cl.
*G06Q 40/00*    (2012.01)
(52) U.S. Cl.
USPC .............................. 705/40; 705/36 R; 705/38
(58) Field of Classification Search
USPC .......................................... 705/36 R, 38, 40
See application file for complete search history.

(56) References Cited

U.S. PATENT DOCUMENTS

| | | | | |
|---|---|---|---|---|
| 4,876,648 A | * | 10/1989 | Lloyd .............................. | 705/38 |
| 5,945,653 A | * | 8/1999 | Walker et al. .................. | 235/380 |
| 5,978,780 A | * | 11/1999 | Watson ........................... | 705/40 |
| 6,049,775 A | * | 4/2000 | Gertner et al. ................ | 705/7.22 |
| 6,088,684 A | * | 7/2000 | Custy et al. ..................... | 705/35 |
| 6,105,007 A | * | 8/2000 | Norris ............................. | 705/38 |
| 6,128,603 A | * | 10/2000 | Dent et al. ...................... | 705/40 |
| 6,196,458 B1 | * | 3/2001 | Walker et al. .................. | 235/380 |
| 6,839,687 B1 | * | 1/2005 | Dent et al. ...................... | 705/40 |
| 2002/0029194 A1 | * | 3/2002 | Lewis et al. ..................... | 705/39 |
| 2002/0059139 A1 | * | 5/2002 | Evans .............................. | 705/40 |
| 2002/0120567 A1 | * | 8/2002 | Caplan et al. .................. | 705/40 |
| 2002/0120568 A1 | * | 8/2002 | Leblang et al. ................. | 705/40 |
| 2002/0169664 A1 | * | 11/2002 | Walker et al. .................. | 705/14 |
| 2002/0169719 A1 | * | 11/2002 | Dively et al. ................... | 705/40 |
| 2003/0033230 A1 | * | 2/2003 | McCall ........................... | 705/36 |
| 2003/0097332 A1 | * | 5/2003 | Golasinski et al. ............ | 705/40 |
| 2004/0054630 A1 | * | 3/2004 | Ginter et al. .................... | 705/53 |
| 2006/0212393 A1 | * | 9/2006 | Lindsay Brown .............. | 705/40 |
| 2007/0271135 A1 | * | 11/2007 | Bracha ............................ | 705/14 |

OTHER PUBLICATIONS

AB 865 Assembly Bill—Chaptered (As provided by the Applicant).*
Cal. Civ. Code Section 1748.12. Operative on Apr. 1, 2002.*
Anonymous. Banking & Financial Services Policy Report. The Monitor. Nov. 2000; 19, 16; ProQuest Central. p. 24.*
Assembly Bill AB 865, Chaptered.

* cited by examiner

*Primary Examiner* — Muriel Tinkler
(74) *Attorney, Agent, or Firm* — Kilpatrick Townsend & Stockton LLP

(57) ABSTRACT

A method of presenting account payoff information to customers includes receiving electronic data relating to a plurality of customers and evaluating the data to determine a class to which each customer belongs. The method also includes preparing an account statement for each customer in a first class and for each customer in a second class. The account statement for each customer in the first class includes a standard message, and the account statement for each customer in the second class includes a detailed message. The method also includes transmitting an electronic file comprising the account statements for the plurality of customers to a statement generator. The standard message comprises a total time to pay off at least one hypothetical account balance at a hypothetical interest rate based on a first series of minimum payments. The detailed message comprises a total time to pay off an account balance of the customer at an interest rate of the customer based on a second series of minimum payments.

23 Claims, 1 Drawing Sheet

US 8,560,444 B2

SYSTEMS AND METHODS FOR PRESENTING PAYOFF INFORMATION TO CREDIT CARD CUSTOMERS

BACKGROUND OF THE INVENTION

The present invention relates generally to financial statements. The present invention relates more specifically to methods and systems for providing account balance payoff information to customers on their billing statements.

Banks and other financial institutions that issue credit offer many different plans to customers. For example, different plans may award loyalty points or credits such as airline miles. Different plans have different annual fees, late payment penalties, interest rates, minimum payments, and the like. Further, within a plan, different interest rates, minimum payments, and the like may apply to different types of transactions. Thus, plans are designed to attract and maintain a variety of different types of customers, and any particular plan may include a range of different variables.

It is well known that merchants accept credit cards as one form of payment in service and merchandise transactions. Correctly processing a transaction may involve the merchant's bank, a credit card association such as Visa or MasterCard, and the issuing bank. In some cases, a credit processing organization processes transactions on behalf of issuing banks, retailers, or financial institutions. Transaction data is used to produce statements that are then sent to customers for payment. Statements may include a listing of recent transactions, payments received, interest charged, an outstanding balance, a minimum payment due, and the like.

The present invention provides additional information to be displayed on billing statements.

BRIEF SUMMARY OF THE INVENTION

Embodiments of the present invention thus provide a method of presenting account payoff information to customers. The method includes receiving electronic data relating to a plurality of customers and evaluating the data to determine a class to which each customer belongs. The method also includes preparing an account statement for each customer in a first class and for each customer in a second class. The account statement for each customer in the first class includes a standard message, and the account statement for each customer in the second class includes a detailed message. The message also includes transmitting an electronic file including the account statements for the plurality of customers to a statement generator. The standard message comprises a total time to pay off at least one hypothetical account balance at a hypothetical interest rate based on a first series of minimum payments and the detailed message comprises a total time to pay off an account balance of the customer at an interest rate of the customer based on a second series of minimum payments.

In some embodiments the standard message includes a total cost to pay off the at least one hypothetical account balance at the hypothetical interest rate based on the first series of minimum payments, and the detailed message includes a total cost to pay off the account balance of the customer at the interest rate of the customer based on the second series of minimum payments. The first class may include customers who made more than a minimum payment for at least a first number of billing periods during a period of time preceding a current billing period. The first number may be in the range from about 1 to about 5 and the period of time may be 6 months. The second class may include customers who made a minimum payment or less for at least a second number of billing periods during a period of time preceding a current billing period. The second number may be 6 or more and the period of time may be 6 months.

The method may include preparing an account statement for each customer in a third class. The account statement for each customer in the third class may include a negative amortization message. The negative amortization message may include a statement that the customer cannot pay off the account balance making minimum payments. The third class may include customers having an interest rate for a current billing period that exceeds a minimum payment percentage for the current period.

Evaluating the data may include determining whether each customer is a qualified customer. Determining whether each customer is a qualified customer may include determining whether a billing address of the customer includes a particular state, determining whether a minimum payment due percentage of a customer is less than a particular minimum payment due percentage, and determining whether any interest is charged on the account of the customer in a current billing period. Evaluating the data may include determining whether each customer is a retail credit card customer or a bank credit card customer.

The method may include preparing an account statement for each customer in a fourth class. The account statement for each customer in the fourth class may include a minimum payment warning message. The minimum payment warning message may include a statement that making minimum payments will increase the time and cost to pay off the account balance. The fourth class may include retail credit card customers having an account balance greater than $500. The standard messages and the detailed messages may appear in a language other than English.

In some embodiments, a method of presenting account payoff information to customers includes receiving electronic data relating to a plurality of customers and evaluating the data to determine a class to which each customer belongs. The method also includes preparing an account statement for each customer in a first class and for each customer in a second class. The account statement for each customer in the first class includes a standard message and the account statement for each customer in the second class includes a detailed message. The method includes transmitting an electronic file comprising the standard messages and the detailed messages for the plurality of customers to a customer service database. The standard message includes a total cost and a total time to pay off at least one hypothetical account balance at a hypothetical interest rate based on a first series of minimum payments, and the detailed message includes a total cost and a total time to pay off an account balance of the customer at an interest rate of the customer designated based on a second series of minimum payments.

The method may include receiving a call from a customer and accessing the customer service database to display information relating to either of the standard message or the detailed message relating to the customer.

In some embodiments, a method of presenting account payoff information to customers includes receiving a request from a client to include a particular message on account statements for each of a plurality of customers based on a particular class of which the customer is a member. The method also includes entering the request into a host computer system. The host computer system is configured to receive an electronic file comprising data relating to the plurality of customers and evaluate the data to determine a class to which each customer belongs. The host computer also is configured to prepare an account statement for each customer. The account statement includes either of a standard message or a detailed message based on the class of which the customer is a member. The standard message includes a total cost and a total time to pay off at least one hypothetical account balance at a hypothetical interest rate based on a first series of minimum payments, and the detailed message comprises a total cost and a total time to pay off an account balance of the customer at an interest rate of the customer based on a second series of minimum payments.

The selection may be that the detailed message be included on account statements for customers in both the first class and the second class. The selection may be that the standard message be included on statements for customers in the first class and the detailed message on account statements for customers in the second class.

In some embodiments, a method of presenting account payoff information to customers includes receiving an electronic file comprising data relating to a plurality of customers and processing the data to produce account statements for the plurality of customers. The method also includes including a first message on the account statement for each of a first number of the plurality of customers and including a second message on the account statement for each of a second number of the plurality of customers. The first message includes a total cost and a total time to pay off an account balance of the customer at an interest rate of the customer based on a first series of minimum payments as determined by a certain formula. The interest rate of the customer is based on multiple interest rates of the customer. The second message may include a total cost and a total time to pay off at least one hypothetical account balance at a hypothetical interest rate based on a second series of minimum payments. The designated interest rate may be determined using a highest interest rate applied to an account during a billing period. Minimum payments in the first series of minimum payments may be determined using a lowest applicable minimum payment percentage during a billing period. The lowest applicable minimum payment percentage may be in the range from about 2 to about 5.

In still other embodiments a system for presenting account payoff information to customers includes a processor, a storage device, and an output device. The processor is configured to receive electronic data relating to a plurality of customers and evaluate the data to determine a class to which each customer belongs. The processor is further configured to prepare an account statement for each customer in a first class and for each customer in a second class. The account statement for each customer in the first class includes a standard message, and the account statement for each customer in the second class comprises a detailed message. The processor is also configured to transmit an electronic file comprising the account statements for the plurality of customers to a statement generator. The standard message includes a total time to pay off at least one hypothetical account balance at a hypothetical interest rate based on a first series of minimum payments, and the detailed message comprises a total time to pay off an account balance of the customer at an interest rate of the customer based on a second series of minimum payments.

The standard message may include a total cost to pay off the at least one hypothetical account balance at the hypothetical interest rate based on the first series of minimum payments, and the detailed message may include a total cost to pay off the account balance of the customer at the interest rate of the customer based on the second series of minimum payments. The first class may include customers who made more than a minimum payment for at least a first number of billing periods during a period of time preceding a current billing period, and the second class may include customers who made a minimum payment or less for at least a second number of billing periods during a period of time preceding a current billing period.

In yet other embodiments, a computer-readable medium having computer-executable instructions for performing a method of presenting account payoff information to customers includes receiving electronic data relating to a plurality of customers and evaluating the data to determine a class to which each customer belongs. The method also includes preparing an account statement for each customer in a first class and for each customer in a second class. The account statement for each customer in the first class includes a standard message, and the account statement for each customer in the second class includes a detailed message. The method also includes transmitting an electronic file including the account statements for the plurality of customers to a statement generator. The standard message includes a total time to pay off at least one hypothetical account balance at a hypothetical interest rate based on a first series of minimum payments, and the detailed message comprises a total time to pay off an account balance of the customer at an interest rate of the customer based on a second series of minimum payments. The standard message may include a total cost to pay off the at least one hypothetical credit card balance at the hypothetical interest rate based on the first series of minimum payments, and the detailed message may include a total cost to pay off the account balance of the customer at the interest rate of the customer based on the second series of minimum payments. The first class may include customers who made more than a minimum payment for at least a first number of billing periods during a period of time preceding a current billing period, and the second class may include customers who made a minimum payment or less for at least a second number of billing periods during a period of time preceding a current billing period.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

The present invention provides systems and methods for providing customers with account balance payoff information. For many reasons, creditors desire efficient methods and systems for developing and presenting account payoff information.

Many revolving credit accounts in the United States are administered by credit processing companies. Herein, such processing companies are referred to as credit processing organizations or simply processing organizations. Processing organizations administer credit accounts on behalf of banks, retailers, financial institutions, and other businesses that wish to issue credit. Herein, such businesses are referred to as clients, as in clients of the processing organization. Credit account owners are referred to herein as account owners or customers, as in customers of the clients of the processing organizations. Finally, herein "merchants" refers to a business that accepts credit cards as payment for merchandise or services. Thus, processing organizations receive credit card or other credit transaction data from merchants. Periodically, the processing organization processes the transaction data, according to credit program guidelines designed by their clients, into account statements, which are then sent to customers. The process is explained further with reference to FIG. 1.

Figure 1:
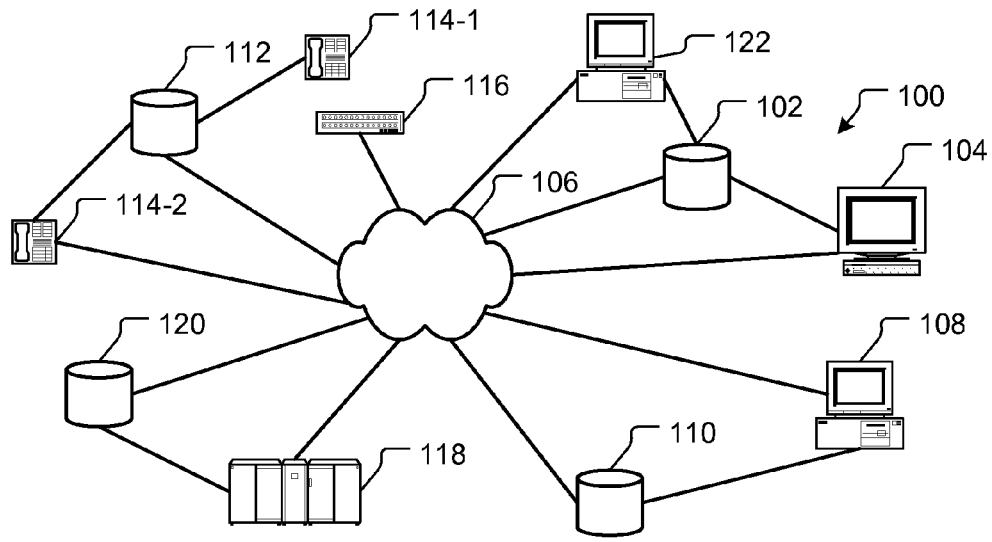
FIG. 1 is a schematic diagram of a system for presenting payoff information to customers according to the present invention.

FIG. 1 illustrates an example of a payoff presentation system 100 for administering credit accounts and presenting payoff information on account statements according to the present invention. This example of the present invention is not limiting. In light of the disclosure herein, those skilled in the art will realize many variations on and equivalents to the system 100 that are within the scope of the present invention. The system 100 includes a payoff information database 102 and a payoff information workstation 104. The database 102 may be any of a number of well-known electronic storage systems. Examples include optical storage systems, such as DVD and CD-ROM, magnetic systems, such as disk drive and tape, solid state systems, such as RAM, combinations of the foregoing, and the like. Likewise, the workstation 104 may be any of a number of well-known computing systems. Examples include desk top computers, workstations, servers, mainframes, and the like. It may also be the case that the database 102 and the workstation 104 are integral with each other, and they may also be components of a larger computing system. Many other configuration examples are possible. The database 102 and workstation 104 may communicate with each other either directly or through a network 106 as shown. The network 106 may be a local area network, a wide area network, an optical network, a virtual private network, the Internet, and the like.

The payoff information database 102 stores information relating to the methods by which particular clients desire account payoff information to be calculated and presented to customers. The payoff information workstation 104 may be used to input such information, as will be explained further below.

The system 100 also includes a customer service terminal 108 and a customer service database 110. The terminal 108 may be any device that allows access to information stored on the database 110 or throughout the system. The database 110 may be any of the data storage systems discussed previously with respect to the payoff information database 102. The particular functions of the customer service database 110 and customer service terminal 108 will be explained further below.

The system 100 also includes a transaction database 112 that receives and stores credit transaction data. The database 112 may be any of the data storage systems discussed previously with respect to the payoff information database 102. Merchants use telephone systems 114 and/or transaction terminals 116 to send transaction information to the processing organization for storage at the database 112. Merchants transmit transactions to the database 112 through any of a number of channels, such as the network 106 or directly, as shown. In some embodiments, transaction data is transmitted from a merchant to the merchant's bank, then through a credit card association, such as Visa or MasterCard, then to the issuing bank or credit processing organization. Thus, the system 100 is only one example of the process by which transactions are transmitted to the transaction database 112.

The system 100 also includes a statement processing computer 118 and statement processing database 120. The computer 118 may be any of the computing devices discussed previously with respect to the payoff information workstation 104. The database 112 may be any of the data storage systems discussed previously with respect to the payoff information database 102. Periodically, the statement processing computer 118 processes transaction data into billing statements for customers. Additional details of the process will be explained further below.

The system 100 also includes a client terminal 122. The terminal may be any computing device that allows access to information stored in the system 100, such as at the payoff information database 102 or the statement processing database 120. A client also may use the terminal to provide selections for how the client wishes to present payoff information to its customers, as will be explained further below.

It should be noted that many elements of the system 100 may be combined into single elements, although illustrated and described as being separate elements, without departing from the scope of the present invention. For example, the statement processing database 120 and the payoff information database 102 may be the same database. Further, both of the databases 120, 102 may be integral with the statement processing computer 118. Many other variations and equivalents are possible and apparent to those having skill in the art in light of the disclosure herein.

As stated previously, credit processing organizations may administer credit programs according to specifications provided by their clients. A credit processing organization may desire to offer its clients the option of providing any one or more of several informational messages to its customers. For example, it may be helpful to provide customers with information relating to the amount of time needed to payoff account balances at various interest rates. To that end, some clients may wish to provide standard, or generic, account payoff messages to their customers. Generic messages might include, for example, a table or a series of statements indicating the total cost and total time to pay off balances of $1,500, $2,500, and $5,000 at 17% annual interest and minimum payments of 2% per month. Many other examples are possible. Thus, using this information, a customer may be able to estimate how long it will take him to pay off his account making minimum payments. In addition, the generic message might include a phone number to call to get a specific account payoff quote for a particular account.

However, other clients may wish to provide their customers with detailed, or specific, account balance payoff messages. Thus, rather than taking up expensive statement space with multiple, hypothetical payoff scenarios, clients may provide all customers with specific payoff quotes based on their account parameters. Further, doing so may reduce the number of calls customers make to customer service representatives. For instance, a customer that receives an account payoff message having only hypothetical scenarios might call customer service to obtain specific account payoff information, while that same customer would not need to contact customer service if the customer is presented with the specific account payoff information. Thus, according to the present invention, credit processing organizations may offer their clients these various options, such as whether to provide specific account payoff information, generic account payoff information, or no account payoff information.

According to the present invention, clients also may be offered the opportunity to provide the account payoff messages to their customers in a particular language of the customer's choosing. The language selection may be determined, for example, at the time the customer applies for the credit account or any time thereafter.

The client's selection for presenting account payoff information, according to the present invention, may be stored, for example, at the payoff information database 102. The information may be entered by the credit processing organization using, for example, the payoff information workstation 104. Alternatively, the client may enter the information using the client terminal 122.

Periodically, the statement processing computer 118 processes the transaction data from the transaction database 112 and other sources into account statements. The statement processing computer 118 also uses information from the payoff information database 102 to generate appropriate payoff messages to be included on the statements. The statements are then sent to the statement processing database 120. Additionally, certain information may be sent to the customer service database 110. For example, the information sent to the customer service database might include the messages sent to each customer, the number of minimum payments the customer made during a preceding period of time, and the like. A statement generating system, which may be located at a client site, may access the information from the statement processing database 120 to print statements that are then sent to customers. Many other examples are possible.

When calculating payoff information for specific messages according to the present invention, in some embodiments certain assumptions may be made about interest rates, minimum payments due, and the like. For example, credit issuers typically provide promotional interest rates for new customers. These rates may apply to all, or only particular transactions, such as balance transfers. Purchases may receive a different interest rate. Cash advances may receive a different interest rate than either purchases or balance transfers, and so forth. Other examples are possible. Minimum payments may also vary according to the types of transactions and the timing of the transactions, for example.

In one example of the present invention, the interest rate for a particular customer is determined to be the highest rate applied to the customer's account during the billing period. The number is rounded such that only whole numbers are used for the interest rate to determine the payoff information. The customer's account balance, for purposes of the payoff determination, is rounded, for example, to the nearest $100. If the customer's minimum payment due may be determined using different percentages of the account balance, then the lowest applicable rate from the following rates is used, subject to rounding. In a specific embodiment, the minimum payment due percentage is 2, 3, 4, or 5. The number of minimum payments needed to pay off the account balance is then determined by recursively: 1) adding the current interest to the current account balance; 2) determining the minimum payment due; and 3) subtracting the minimum payment from the account balance to determine a new account balance. The recursive process is repeated until the account balance reaches zero. The number of times the process repeated is the number of statement cycles needed to pay off the balance. The sum of all minimum payments is the total cost to pay off the account balance. Many other examples for calculating the payoff information are possible. For instance, in some embodiments, the interest rate is calculated to be an average of the applicable interest rates. Other embodiments determine the interest rate to be a weighted average of applicable interest rates. In still other embodiments, one or more interest rates are used without rounding. In some embodiments, the account payoff time and/or cost may be determined such that the numbers match analogous numbers in published tables corresponding to the interest rates, minimum payment percentages, and account balances used in the calculations.

It may be the case that an account payoff timeframe may not be calculated for a customer because the customer is experiencing negative amortization in his account. Negative amortization occurs when the interest rate for a billing period exceeds the minimum payment due percentage for the period. Thus, even if the customer makes no purchases using the account, the customer's account balance increases if the customer makes only minimum payments. According to the present invention, the message provided to customers experiencing negative amortization may include this information.

Figure 2:
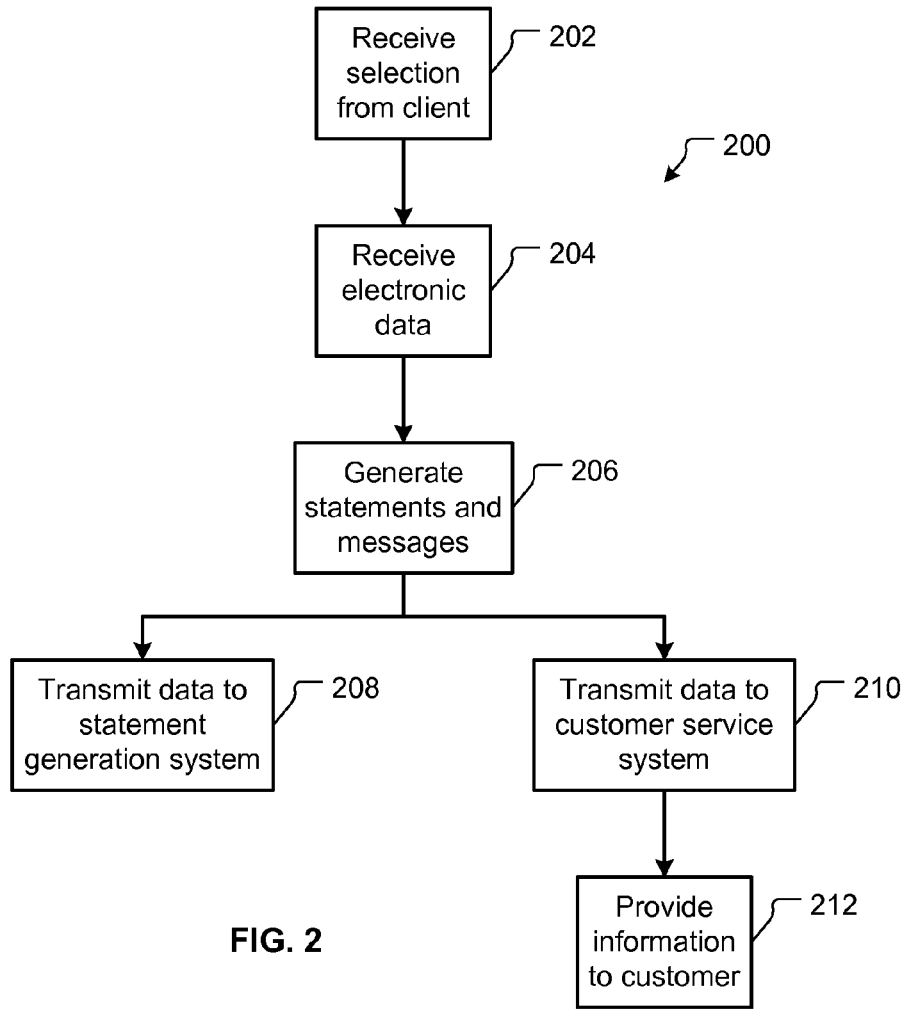
FIG. 2 is a method of providing account payoff information that may be implemented in the system of FIG. 2.

Attention is now directed to FIG. 2, which illustrates a method 200 for determining account payoff information according to the present invention. The method may be implemented in the system 100 of FIG. 1. At operation 202, payoff selection information is received from a client. The information may be received directly via a terminal, such as the terminal 122, or the information may be received by other means and entered via the workstation 104. The information is stored at the database 102. At operation 204, electronic data is received relating to a plurality of customer accounts. The data may include transaction data received from the transaction database 212. The data may also include particular account information, such as interest rates, minimum payment percentages, and the like. The information is received, for example, at the statement processing computer 118.

At operation 206, the data is used to process account statements for the customers. The account statements may include payoff information, according to the payoff selection information. Operation 206 may include "qualifying" customers. For example, it may be the case that only customers in particular states should receive account payoff messages. In a specific embodiment, messages are only sent to customers who: 1) receive their bill in a particular state; 2) have interest charged in a particular billing period; and 3) have a minimum payment due percentage less than a particular minimum payment percentage.

Operation 206 also may include dividing customers into one or more classes that determine the payoff information messages the customers receive. For example, a first class may include all customers not members of another class. In some embodiments, the first class may include qualified customers who made more than a minimum payment for at least one billing period during a preceding period of time. In a specific embodiment, qualified customers who made a payment greater than a minimum payment at least once during the prior six months is a member of the first class. A second class may include customers who made minimum payments or less for six consecutive billing periods. Other examples of the number of consecutive minimum payments used to determine the members of this class include three, five, eight and twelve. Of course other numbers could be used.

Customers in the first class may receive a standard, or hypothetical, message having account payoff information for a range of hypothetical account balances and interest rates, as explained previously. Customers in the second class may receive a message having specific account payoff information for the customer according to the formulas described above. Other examples are possible. For instance, a client may indicate it wants all customers to receive actual account payoff information (i.e., a detailed message). Further, the decision whether to provide a message to a customer and/or the content of the message may be based in part on the type of account, for instance, whether the customer is a bank credit card customer or a retail credit card customer.

At operation 208, the account statement information is transferred to a statement generation system that produces account statements to be mailed to customers. At operation 210, the account statement information is transmitted to a customer service database, such as the database 110. At operation 212, the information is provided to a customer by a customer service representative. The customer service representative receives a request for the information from a customer, for instance, when the customer calls the customer service representative after receiving a statement having a standard message. The customer service representative requests the information from the customer service database, and the information is displayed on a terminal, such as the terminal 108, thereby allowing the customer service representative to view the information and provide it to the customer. Other examples are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to connect computing devices to a network and configure multiprocessors to control the operation of peripheral devices and communicate with other computers. Accordingly, the above description should not be taken as limiting the scope of the invention, which is defined in the following claims.

What is claimed is:

1. A method of presenting account payoff information to customers, comprising:
    receiving, at a computer system of a credit processing organization, from a client, classification information that is employed to classify the client's customers into at least a first class and a second class based on a customer's repayment history of a credit debt with the client, wherein the first class is entitled to a different interest rate on credit debt from the client than the second class;
    receiving, at the computer system of the credit processing organization, electronic data relating to a plurality of customers of the client, wherein the electronic data comprises a first repayment history of a credit debt for a first customer and a second repayment history of a credit debt for a second customer;
    evaluating, at the computer system of the credit processing organization, the first repayment history based at least in part on the classification information to determine that the first customer belongs in the first class;
    evaluating, at the computer system of the credit processing organization, the second repayment history based at least in part on the classification information to determine that the second customer belongs in the second class;
    preparing, at the computer system of the credit processing organization, an account statement for each customer in the first class, wherein:
        payoff selection information received from the client is used to determine a first informational message for the account statement of each customer in the first class, and
        the first informational message for each customer in the first class comprises a standard account payoff message which states a total time to pay off a hypothetical balance at a hypothetical interest rate based on a first particular minimum payment, wherein the hypothetical interest rate is an un-weighted average of interest rates applicable to an account on each statement, wherein the interest rates applicable to the account comprise a balance transfer interest rate, a purchase interest rate, and a cash advance interest rate;
    preparing, at the computer system of the credit processing organization, an account statement for each customer in the second class, wherein:
        payoff selection information received from the client is used to determine a second informational message for the account statement of each customer in the second class, and
        the second informational message for each customer in the second class comprises a detailed account payoff message which states a total time to pay off the customer's actual balance at an actual applicable interest rate based on a second particular minimum payment;
    transmitting, from the computer system of the credit processing organization, an electronic file comprising the account statements for the plurality of customers to a statement generator, wherein the statement generator produces printed account statements for mailing to customers; and
    wherein the account statement for each customer in the first and second class is accessible by the client.

2. The method of claim 1, wherein:
    the standard account payoff message further states a total cost to pay off the hypothetical account balance at the hypothetical interest rate based on the first particular minimum payment; and
    the detailed account payoff message further states a total cost to pay off the customer's actual account balance at the actual applicable interest rate based on the second particular minimum payment.

3. The method of claim 1, wherein the first class comprises customers who made more than a minimum payment for at least a first number of billing periods during a period of time preceding a current billing period.

4. The method of claim 3, wherein the first number is in the range from about 1 to about 6 and the period of time is 6 months.

5. The method of claim 1, wherein the second class comprises customers who made a minimum payment or less for at least a second number of billing periods during a period of time preceding a current billing period.

6. The method of claim 5, wherein the second number comprises 6 or more and the period of time is 6 months.

7. The method of claim 1, further comprising:
    evaluating, at the computer system of the credit processing organization, a third repayment history of a third customer based at least in part on the classification information to determine that the third customer belongs in a third class;
    preparing an account statement for each customer in a third class, wherein the account statement for each customer in the third class comprises a negative amortization message, wherein the negative amortization message comprises a statement that it is not possible for the customer to pay off the account balance by only making minimum payments because the interest per billing period exceeds the minimum payment.

8. The method of claim 1, wherein evaluating comprises determining whether each customer is a qualified customer.

9. The method of claim 8, wherein determining whether each customer is a qualified customer comprises determining whether a billing address of the customer includes a particular state, determining whether a minimum payment due percentage of a customer is less than a particular minimum payment due percentage, and determining whether any interest is charged on the account of the customer in a current billing period.

10. The method of claim 1, wherein evaluating comprises determining whether each customer is a retail credit card customer or a bank credit card customer.

11. The method of claim 10, further comprising preparing an account statement for each customer in a fourth class, wherein the account statement for each customer in the fourth class comprises a minimum payment warning message, wherein the minimum payment warning message comprises a statement that making minimum payments will increase the time and cost to pay off the account balance.

12. The method of claim 11, wherein the fourth class comprises retail credit card customers having an account balance greater than $500.

13. The method of claim 1, wherein the standard messages and the detailed messages appear in a language other than English.

14. A method of presenting account payoff information to customers, comprising:
   receiving, at a computer system of a credit processing organization, from a client, classification information that is employed to classify the client's customers into at least a first class and a second class based on a repayment history of a credit debt with the client, wherein the first class is entitled to a different interest rate on credit debt from the client than the second class;
   receiving, at the computer system of the credit processing organization, electronic data relating to a plurality of customers of the client, wherein the electronic data comprises a first repayment history of a credit debt for a first customer and a second repayment history of a credit debt for a second customer;
   evaluating, at the computer system of the credit processing organization, the first repayment history based at least in part on the classification information to determine that the first customer belongs in the first class;
   evaluating, at the computer system of the credit processing organization, the second repayment history based at least in part on the classification information to determine that the second customer belongs in the second class;
   preparing, at the computer system of the credit processing organization, an account statement for each customer in the first class, wherein:
      payoff selection information received from the client is used to determine a first informational message for the account statement of each customer in the first class, and
      the first informational message for each customer in the first class comprises a standard account payoff message which states a total time to pay off a hypothetical balance at a hypothetical interest rate based on a first particular minimum payment, wherein the hypothetical interest rate is an un-weighted average of interest rates applicable to an account on each statement, wherein the interest rates applicable to the account comprise a balance transfer interest rate, a purchase interest rate, and a cash advance interest rate;
   preparing, at the computer system of the credit processing organization, an account statement for each customer in the second class, wherein
      payoff selection information received from the client is used to determine a second informational message for the account statement of each customer in the second class, and
      the second informational message for each customer in the second class comprises a detailed account payoff message which states a total time to pay off the customer's actual balance at an actual applicable interest rate based on a second particular minimum payment;
   transmitting, from the computer system of the credit processing organization, an electronic file comprising the standard messages and the detailed messages for the plurality of customers to a customer service database; and
   wherein the account statement for each customer in the first and second class is accessible by the client.

15. The method of claim 14, further comprising:
   receiving a call from a customer;
   accessing the customer service database; and
   displaying on a display screen information relating to either of the standard account payoff message or the detailed account payoff message relating to the customer.

16. A system for presenting account payoff information to customers, comprising:
   a processor of a credit processing organization;
   a storage device; and
   an output device;
   wherein the processor is configured to:
      receive classification information, wherein:
         the classification information is received from a client;
         the classification information is employed to classify the client's customers into at least a first class and a second class based on a customer's repayment history of a credit debt; and
         the first class is entitled to a different interest rate on credit debt from the client than the second class;
      receive electronic data relating to a plurality of the client's customers, wherein the electronic data comprises a first repayment history of a credit debt for a first customer and a second repayment history of a credit debt for a second customer;
      evaluate the first repayment history based at least in part on the classification information to determine that the first customer belongs in the first class;
      evaluate the second repayment history based at least in part on the classification information to determine that the second customer belongs in the second class;
      prepare an account statement for each customer in the first class, wherein:
         payoff selection information received from the client is used to determine a first informational message for the account statement of each customer in the first class, and
         the first informational message for each customer in the first class comprises a standard account payoff message which states a total time to pay off a hypothetical balance at a hypothetical interest rate based on a first particular minimum payment, wherein the hypothetical interest rate is an un-weighted average of interest rates applicable to an account on each statement, wherein the interest rates applicable to the account comprise a balance transfer interest rate, a purchase interest rate, and a cash advance interest rate;

prepare an account statement for each customer in the second class, wherein:
payoff selection information received from the client is used to determine a second informational message for the account statement of each customer in the second class, and
the second informational message for each customer in the second class comprises a detailed account payoff message which states a total time to pay off the customer's actual balance at an actual applicable interest rate based on a second particular minimum payment;

transmit an electronic file comprising the account statements for the plurality of customers to a statement generator, wherein the statement generator produces printed account statements for mailing to customers; and wherein the account statement for each customer in the first and second class is accessible by the client.

17. The system of claim 16, wherein the standard account payoff message further states a total cost to pay off the hypothetical account balance at the hypothetical interest rate based on the first particular minimum payment, and wherein the detailed account payoff message further states a total cost to pay off the customer's actual account balance at the actual applicable interest rate based on the second particular minimum payment.

18. The system of claim 16, wherein the first class comprises customers who made more than a minimum payment for at least a first number of billing periods during a period of time preceding a current billing period, and wherein the second class comprises customers who made a minimum payment or less for at least a second number of billing periods during a period of time preceding a current billing period.

19. A computer-readable medium having computer-executable instructions that, when executed by a computer of a credit processing organization, cause the computer to perform a method of presenting account payoff information to customers, comprising:
receiving, from a client, classification information that is employed to classify the client's customers into at least a first class and a second class based on a customer's repayment history of a credit debt with the client, wherein the first class is entitled to a different interest rate on credit debt from the client than the second class;
receiving electronic data relating to a plurality of customers of the client, wherein the electronic data comprises a first repayment history of a credit debt for a first customer and a second repayment history of credit debt for a second customer;
evaluating the first repayment history based at least in part on the classification information to determine that the first customer belongs in the first class;
evaluating the second repayment history based at least in part on the classification information to determine that the second customer belongs in the second class;
preparing an account statement for each customer in the first class, wherein:
payoff selection information received from the client is used to determine a first informational message for the account statement of each customer in the first class, and
the first informational message for each customer in the first class comprises a standard account payoff message which states a total time to pay off a hypothetical balance at a hypothetical interest rate based on a first particular minimum payment, wherein the hypothetical interest rate is an un-weighted average of interest rates applicable to an account on each statement, wherein the interest rates applicable to the account comprise a balance transfer interest rate, a purchase interest rate, and a cash advance interest rate;

preparing an account statement for each customer in the second class, wherein:
payoff selection information received from the client is used to determine a second informational message for the account statement of each customer in the second class, and
the second informational message for each customer in the second class comprises a detailed account payoff message which states a total time to pay off the customer's actual balance at an actual applicable interest rate based on a second particular minimum payment;

transmitting an electronic file comprising the account statements for the plurality of customers to a statement generator, wherein the statement generator produces printed account statements for mailing to customers;

wherein the standard account payoff message comprises a total time to pay off at least one hypothetical account balance at a hypothetical interest rate based on a first series of minimum payments;

wherein the detailed account payoff message comprises a total time to pay off an account balance of the customer at an interest rate of the customer based on a second series of minimum payments; and wherein the account statement for each customer in the first and second class is accessible by the client.

20. The medium of claim 19, wherein the standard account payoff message further states a total cost to pay off the hypothetical credit card balance at the hypothetical interest rate based on the first particular minimum payment, and wherein the detailed account payoff message further states a total cost to pay off the customer's actual account balance at the actual applicable interest rate based on the second particular minimum payment.

21. The medium of claim 19, wherein the first class comprises customers who made more than a minimum payment for at least a first number of billing periods during a period of time preceding a current billing period, and wherein the second class comprises customers who made a minimum payment or less for at least a second number of billing periods during a period of time preceding a current billing period.

22. A method of presenting account payoff information to customers, comprising:
receiving, at a computer system of a credit processing organization, from a client, classification information that is employed to classify the client's customers into at least a first class and a second class based on a customer's repayment history of a credit debt with the client;
receiving, at the computer system of the credit processing organization, electronic data relating to a plurality of customers of the client, wherein the electronic data comprises a first repayment history of a credit debt for a first customer and a second repayment history of a credit debt for a second customer;
evaluating, at the computer system of the credit processing organization, the first repayment history based at least in part on the classification information to determine that the first customer made more than a minimum payment for at least one billing period during a first preceding period of time, and therefore that the first customer belongs in the first class;

evaluating, at the computer system of the credit processing organization, the second repayment history based at least in part on the classification information to determine that the second customer made minimum payments or less for each billing period during a second preceding period of time, and therefore that the second customer belongs in the second class;

preparing, at the computer system of the credit processing organization, an account statement for each customer in the first class, wherein payoff selection information received from the client is used to determine a first informational message for the account statement of each customer in the first class, wherein the first informational message for each customer in the first class comprises a standard account payoff message which states a total time to pay off a hypothetical balance at a hypothetical interest rate based on a first particular minimum payment, wherein the hypothetical interest rate is an un-weighted average of interest rates applicable to an account on each statement, wherein the interest rates applicable to the account comprise a balance transfer interest rate, a purchase interest rate, and a cash advance interest rate;

preparing, at the computer system of the credit processing organization, an account statement for each customer in the second class, wherein payoff selection information received from the client is used to determine a second informational message for the account statement of each customer in the second class, and wherein the second informational message comprises different information from the first informational message; and transmitting, from the computer system of the credit processing organization, an electronic file comprising the account statements for the plurality of customers to a statement generator, wherein the statement generator produces printed account statements for mailing to customers.

23. A method of presenting account payoff information to customers, comprising:

receiving, at a computer system of a credit processing organization, from a client, classification information that is employed to classify the client's customers into at least a first class and a second class based on a customer's repayment history of a credit debt with the client;

receiving, at the computer system of the credit processing organization, electronic data relating to a plurality of customers of the client, wherein the electronic data comprises:

a first repayment history of a credit debt for a first customer and a second repayment history of a credit debt for a second customer, wherein each of the first repayment history and the second repayment history include a number of minimum payments made during a preceding period;

a first identification of a state the first customer resides in and a second identification of a state the second customer resides in; and a first indication that the credit debt of the first customer is a bank credit card debt and a second indication that the credit debt of the second customer is a retail credit card debt;

evaluating, at the computer system of the credit processing organization, the first repayment history based at least in part on the classification information to determine that the first customer made more than a minimum payment for at least one billing period during a first preceding period of time, and therefore that the first customer belongs in the first class;

evaluating, at the computer system of the credit processing organization, the second repayment history based at least in part on the classification information to determine that the second customer made minimum payments or less for each billing period during a second preceding period of time, and therefore that the second customer belongs in the second class;

preparing, at the computer system of the credit processing organization, an account statement for the first customer, wherein payoff selection information received from the client, the first identification, and first indication are used to determine a first informational message for the account statement of each customer in the first class, wherein the first informational message for each customer in the first class comprises a standard account payoff message which states a total time to pay off a hypothetical balance at a hypothetical interest rate based on a first particular minimum payment, wherein the hypothetical interest rate is an un-weighted average of interest rates applicable to an account on each statement, wherein the interest rates applicable to the account comprise a balance transfer interest rate, a purchase interest rate, and a cash advance interest rate;

preparing, at the computer system of the credit processing organization, an account statement for the second customer, wherein payoff selection information received from the client, the second identification, and second indication are used to determine a second informational message for the account statement of each customer in the second class, and wherein the second informational message comprises different information from the first informational message; and transmitting, from the computer system of the credit processing organization, an electronic file comprising the account statements for the plurality of customers to a statement generator, wherein the statement generator produces printed account statements for mailing to customers.

* * * * *